United States Patent
Komatsu et al.

(10) Patent No.: US 8,038,768 B2
(45) Date of Patent: Oct. 18, 2011

(54) EXHAUST GAS TREATMENT METHOD AND SYSTEM IN CEMENT BURNING FACILITY

(75) Inventors: Yoshiaki Komatsu, Fukuoka (JP); Michio Ishizaki, Fukuoka (JP); Haruki Miura, Tokyo (JP)

(73) Assignee: Mitsubishi Materials Corporation, Tokyo (JP)

( * ) Notice: Subject to any disclaimer, the term of this patent is extended or adjusted under 35 U.S.C. 154(b) by 490 days.

(21) Appl. No.: 12/307,285

(22) PCT Filed: Dec. 19, 2007

(86) PCT No.: PCT/JP2007/001426
§ 371 (c)(1),
(2), (4) Date: Jan. 2, 2009

(87) PCT Pub. No.: WO2009/078066
PCT Pub. Date: Jun. 25, 2009

(65) Prior Publication Data
US 2011/0185953 A1 Aug. 4, 2011

(51) Int. Cl.
*C04B 7/44* (2006.01)
*B01D 53/68* (2006.01)

(52) U.S. Cl. ............ 95/1; 95/271; 106/751; 423/240 R

(58) Field of Classification Search .......... 95/1, 34, 95/271, 273; 55/459.1; 96/408; 106/751; 423/240 R, 240 S
See application file for complete search history.

(56) References Cited

U.S. PATENT DOCUMENTS

| 4,115,137 | A | * | 9/1978 | Nudelman et al. | ........... 106/740 |
| 5,937,771 | A | | 8/1999 | Sutoh et al. | |
| 5,951,279 | A | * | 9/1999 | Hunold et al. | ............... 432/106 |
| 6,068,826 | A | * | 5/2000 | Maury et al. | ............ 423/240 R |
| 7,789,944 | B2 | * | 9/2010 | Saito et al. | ................ 95/228 |
| 7,947,242 | B2 | * | 5/2011 | Saito et al. | .............. 423/242.1 |

FOREIGN PATENT DOCUMENTS

| JP | 11-130489 | | 5/1999 |
| JP | 2001-239132 | | 9/2001 |
| JP | 2001-239132 A | * | 9/2001 |
| JP | 3318714 | | 8/2002 |

OTHER PUBLICATIONS

U.S. Appl. No. 12/564,643, filed Sep. 22, 2009, Komatsu, et al.

* cited by examiner

*Primary Examiner* — Frank Lawrence, Jr.
(74) *Attorney, Agent, or Firm* — Oblon, Spivak, McClelland, Maier & Neustadt, L.L.P.

(57) ABSTRACT

An exhaust gas treatment method and system of a cement burning facility, wherein a chlorine concentration of the collected fine powder dust is set in a range of 5 to 20% in such a manner that when a part of exhaust gas is extracted as extracted gas from a lowermost part of a preheater, or a kiln inlet part of a cement kiln, a cement raw material is dispersed and the temperature of the extracted gas is held in a range of 950° to 1150° C. By adjusting the dispersion amount of the cement raw material, the extracted gas is cooled to a melting point or less of a chlorine compound, and a classification particle size in a solid-gas separator is then adjusted in a range of 12 μm to 30 μm, to separate for removal and collection fine powder dust.

5 Claims, 3 Drawing Sheets

EXHAUST GAS TREATMENT METHOD AND SYSTEM IN CEMENT BURNING FACILITY

TECHNICAL FIELD

The present invention relates to an exhaust gas treatment method and system of a cement burning facility, in which a chlorine bypass is used for suppressing the chlorine concentration from being increased in the system of the cement burning facility.

BACKGROUND ART

In recent years, in order to solve the waste disposal problem, various wastes are used as a part of a cement raw material or a part of a heating fuel used in a cement kiln. However, when wastes, such as synthetic resin, are charged into the cement kiln as a part of the fuel, a chlorine component having volatility is generated during combustion. The chlorine component is sent to a preheater together with exhaust gas discharged out of the cement kiln. However, when the atmosphere temperature becomes below the melting point of the chlorine component as the exhaust gas is transferred to the upper stage side of the preheater, the chlorine component is condensed to adhere to the cement raw material, and is again sent to the inside of the cement kiln, so as to be evaporated again according to the increase in the atmosphere temperature.

In this way, the chlorine component taken into the system of the cement burning facility is circulated by repeating evaporation and condensation in the inside of the cement kiln and the preheater. Also, when a chlorine component generated from newly charged wastes is added to the circulating chlorine component, the concentration of the chlorine component is increased, so as to thereby result in clogging in the preheater due to coating, and the like. For this reason, there arise problems that stable operation of the facility is obstructed and that the quality of manufactured cement clinker is also affected.

Thus, in order to solve the above described problem, for example, in patent document 1 as will be described below, there is proposed a kiln exhaust gas treatment method based on the chlorine bypass, which method includes: a process of extracting a part of kiln exhaust gas from a kiln; a process of cooling the extracted exhaust gas to the melting point or lower of a chlorine compound; a process of separating dust in the exhaust gas into coarse powder and fine powder by a classifier; and a process of returning the separated coarse powder to the kiln and of discharging the fine powder to the downstream side of the classifier, and which method is characterized in that the ratio of extraction amount of the kiln exhaust gas is set to more than 0% to 5% or less, in that the separation particle size in the classifier is set to 5 µm to 7 µm, and in that the discharged amount of the fine powder is set to 0.1% or less of the production amount of the clinker.

According to the kiln exhaust gas treatment method having the above described configuration, it is possible to stably operate the rotary kiln in such a manner that the exhaust gas, which contains the fine powder dust separated in the classifier and having a high chlorine content, is sent to a dust collector, and that the fine powder dust having the high chlorine content is collected and discharged to the outside of the system. Further, it is possible to effectively remove the chlorine at a minimum heat loss and possible to reduce the extracted gas amount, and hence the scale of the treatment facility can be reduced. As a result, it is possible to obtain the effects that the space and cost of the facility can be reduced, and that the kiln can be economically and stably operated.

However, in the conventional kiln exhaust gas treatment method as described above, the particle diameter of the fine powder dust collected by the dust collector is set to a very fine particle diameter in the range of 7 µm down to 5 µm or less. For this reason, a general purpose type cannot be used as the classifier, and hence it is necessary to install a classifier having high performance, which needs to be finely controlled during the operation. This results in a problem of increase in the installation cost of the classifier.

In addition, the very fine powder dust is collected, so that the chlorine concentration in the collected fine powder dust is extremely increased. For this reason, in the case where the chlorine concentration in the fine powder dust exceeds 20%, the handling property of the collected fine powder dust is significantly deteriorated due to the deliquescence, or the like, of the chlorine compound adhering to the fine powder dust. This also leads to a problem that the fine powder dust adheres to the inner peripheral wall of a conveying pipe, a hopper, and the like (to cause the coating), so as to easily cause a trouble such as clogging of hopper and chute. As a result, there are problems that it is difficult to perform the stable operation and that the maintenance cost is also increased.

Patent document 1: Japanese Patent No. 3318714

DISCLOSURE OF THE INVENTION

The present invention has been made in view of the above described circumstances. An object of the present invention is to provide an exhaust gas treatment method and system of a cement burning facility, which can be configured by using general purpose apparatuses, so as to thereby reduce the system cost, and which is capable of improving the handling property of the collected fine powder dust, so as to thereby realize the stable operation without the need of maintenance.

In order to solve the above described problems, the present inventors have examined the effects of the chlorine concentration and the particle size of the fine powder dust on the handling property of the fine powder dust.

First, the average particle size of cement raw material powder is distributed from a maximum of 200 µm to a minimum of several micrometers, but is generally distributed in a range of about 20 µm to about 30 µm. Therefore, it is considered that when the classification particle size of dust entrained in the extracted gas is set to 10 µm or less, the dust finally collected from the extracted gas is mostly formed of chlorine particles, with which the very fine cement raw material powder is mixed.

Therefore, the present inventors obtained the finding that when the classification particle size is set to 10 µm or less, not only the chlorine concentration is significantly increased, but also the collected fine powder dust becomes in a cotton-like state, and that consequently, the handling property of the fine powder dust is extremely deteriorated and also the coating causing a blockade and clogging in the facility is liable to occur due to the deliquescence, or the like, of the chlorine component. Further, it was found that when the chlorine concentration in the fine powder dust is suppressed to 20% or less, it is possible to prevent the adhesion and clogging of the fine powder dust due to the coating during the conveying process.

Then, the extracted gas from the cement kiln was cooled to the melting point or less of the chlorine compound, and the dust having a particle size of about 25 µm or more was separated from the extracted gas by a cyclone type classifier.

Thereafter, at the time of collecting the fine powder dust having a particle size of about 25 μm or less by using a bag filter, the influence of the fine powder dust on the chlorine concentration was checked by changing the dust concentration in the extracted gas by positively dispersing the cement raw material in the extracted gas. As a result, it was confirmed that, as shown in FIG. 2, the chlorine concentration is lowered as the dust concentration is increased.

Further, when the cement raw material is positively dispersed in the exhaust gas from the cement kiln from which the extracted gas is extracted, the temperature of the exhaust gas is decreased, as the dust concentration in the extracted gas is increased. Further, it was found that the increase in the dust concentration in the extracted gas is substantially in proportional relation to the decrease in the temperature of the exhaust gas as shown in FIG. 3.

Therefore, the present inventors obtained the finding, as shown in FIG. 2, FIG. 3 and FIG. 4, that the chlorine concentration in the finally collected fine powder dust can be easily controlled in such a manner that the dust concentration in the extracted gas is adjusted by adjusting the temperature of the extracted gas by dispersing the cement raw material. Also, it was found from the above described confirmation test that it is only necessary to set the temperature of the extracted gas to 1150° C. or less in order to suppress the chlorine concentration to 20% or less, at which the handling property of the fine powder dust is not influenced, as described above.

Further, in the case where the coarse powder dust is separated from the extracted gas by the cyclone type classifier, when the particle size of the fine powder dust is reduced by reducing the classification particle size, the chlorine concentration in the fine powder dust is also increased. However, as described above, when the classification particle size is set to 10 μm or less, most of the dust finally collected from the extracted gas is formed of chlorine particles, and thereby the chlorine concentration is significantly increased. On the other hand, however, it was also found that when the classification particle size is adjusted in a range of 10 μm or more, more preferably, in a range of 12 μm or more, the chlorine concentration can be suppressed to 20% or less as long as the temperature of the extracted gas is set to 1150° C. or less.

The present invention has been made on the basis of the above described findings. According to a first aspect of the present invention, there is provided an exhaust gas treatment method of a cement burning facility, configured to extract, as extracted gas, a part of exhaust gas that contains dust and that is discharged from a cement kiln for burning a cement raw material and is sent to a preheater for preheating the cement raw material, from a lowermost part of the preheater, or a kiln inlet part of the cement kiln, configured, after the extracted gas is cooled to a melting point or less of a chlorine compound, to separate the dust having a predetermined particle size or more from the extracted gas by solid-gas separation means, and to return the separated dust to the burning process of the cement raw material, and configured to collect and remove fine powder dust having the predetermined particle size or less from the extracted gas containing the fine powder dust by dust trap means, and to thereby remove a chlorine compound contained in the extracted gas, the exhaust gas treatment method being characterized by setting the chlorine concentration in the collected fine powder dust in a range of 5 to 20% in such a manner that the cement raw material is dispersed in the exhaust gas at a lowermost part of the preheater or a kiln inlet part of the cement kiln, that the temperature of the extracted gas is held in the range of 950° C. to 1150° C. by adjusting the dispersion amount of the cement raw material, and that the predetermined particle size in the solid-gas separation means is adjusted within a range of 12 μm to 30 μm.

Here, as the cement raw material dispersed in order to adjust the temperature of the extracted gas, that is, the dust concentration in the extracted gas, it is preferred to mainly use the cement raw material charged into the kiln inlet part from the lowermost stage of the preheater via a raw material chute.

Further, in order to adjust the temperature of the kiln inlet part, that is, the temperature of the extracted gas in parallel with the dispersion of the cement raw material in the exhaust gas, the cement raw material of a lower temperature which is auxiliarily extracted from the preheater, and the cement raw material in which various raw materials are mixed and dried and which is before being conveyed to the preheater, may also be introduced into the kiln inlet part.

Further, a second aspect of the present invention is characterized in that in the first aspect, one percent or more of the amount of the exhaust gas is extracted as the extracted gas.

Then, according to a third aspect of the present invention, there is provided an exhaust gas treatment system of a cement burning facility, configured to extract, as extracted gas, a part of exhaust gas that contains dust and that is discharged from a cement kiln for burning a cement raw material and is sent to a preheater for preheating the cement raw material, and configured to remove a chlorine compound contained in the extracted gas, the exhaust gas treatment system being characterized in that along an extracted gas duct which is connected to a lowermost part of the preheater or a kiln inlet part of the cement kiln so as to extract the extracted gas, there are provided: a cooler configured to cool the extracted gas successively extracted from the extracted gas duct to a melting point or less of the chlorine compound; solid-gas separation means configured to separate the dust having a predetermined particle size or more from the extracted gas exhausted from the cooler; dust trap means configured to collect and remove entrained fine powder dust having the predetermined particle size or less from the extracted gas from which the dust having the predetermined particle size or more is separated in the solid-gas separation means; and an induction fan provided in the downstream side of the dust trap means and configured to suck the extracted gas, and in that dispersion means configured to disperse the cement raw material in the exhaust gas is provided at a lowermost part of the preheater or at a location inside the kiln inlet part of the cement kiln and close to the connection part of the extracted gas duct, and characterized by including: drive means configured to adjust the amount of the cement raw material dispersed by the dispersion means; temperature detection means configured to detect the temperature of the extracted gas; a first control apparatus configured to hold the temperature of the extracted gas in a range of 950° C. to 1150° C. on the basis of the temperature detected by the temperature detection means; and a second control apparatus configured to adjust the predetermined particle size in the solid-gas separation means in a range of 12 μm to 30 μm so that the chlorine concentration in the fine powder dust collected by the dust trap means is set in a range of 5% to 20%.

Further, a fourth aspect according to the present invention is characterized in that in the third aspect, the solid-gas separation means is a cyclone type classifier, in that a flow rate adjustment apparatus of the extracted gas is provided on the inlet side of the cyclone type classifier, and in that a chlorine concentration detector of the fine powder dust is provided and the second control apparatus controls the amount of the extracted gas sucked by the induction fan and/or the flow rate adjustment apparatus of the extracted gas on the basis of a signal detected by the chlorine concentration detection means.

Further, a fifth aspect according to the present invention is characterized in that in one of the third aspect and the fourth aspect, the dispersion means is a dispersion plate which is provided below a drop port of the raw material chute for charging the cement raw material into the kiln inlet part from the preheater, so as to freely project and retract from immediately below the drop port, and which is configured to disperse in the exhaust gas the cement raw material dropped from the drop port.

According to one of the first aspect to the fifth aspect of the present invention, the fine powder dust contained in the extracted gas and having a high chlorine concentration can be collected and removed by the dust trap means, and thereby it is possible to prevent the chlorine concentration from being increased in the system. In addition, it is possible to easily suppress the chlorine concentration in the finally collected fine powder dust to 20% or less in such a manner that the temperature of the extracted gas is held in the range of 950° C. to 1150° C. by dispersing the cement raw material in the exhaust gas at the lowermost part of the preheater or at the kiln inlet part of the cement kiln, from which parts the extracted gas is extracted.

Thereby, the handling property of the fine powder dust is made excellent. Also, there is no possibility that the blockage, clogging, and the like, are caused in the facility due to the chlorine component contained in the fine powder dust during the conveyance of the fine powder dust, and hence it is possible to stably operate the facility.

Further, since the classification particle size in the solid-gas separation means only needs to be set within the range of 12 μm to 30 μm, it is possible to use, for example, a general-purpose cyclone type classifier, and the like, as the solid-gas separation means. Thus, there is also no possibility that the facility cost is increased.

Here, the reason why the temperature of the extracted gas is set to 950° C. or more, and why the chlorine concentration in the fine powder dust is consequently set to 5% or more, is because when the cement raw material is dispersed in the exhaust gas to such an extent that the temperature of the extracted gas is reduced to 950° C. or less, there arise disadvantages that the heat loss is increased so as to lower the economic efficiency, and that the dust concentration in the extracted gas is excessively increased, so as to increase the amount of the fine powder dust finally collected and removed.

Further, the reason why the classification particle size in the solid-gas separation means is set to 12 μm to 30 μm is because when the classification particle size is less than 12 μm, the ratio of the chlorine particles in the fine powder dust is significantly increased as described above, so as to thereby make it difficult to suppress the chlorine concentration in the fine powder dust to 20% or less, and because on the other hand, when the classification particle size exceeds 30 μm, the amount of the fine powder dust to be finally disposed is increased, so as to thereby lower the economic efficiency.

Further, when, as described above, the cement raw material charged into the kiln inlet part from the lowermost part of the preheater via the raw material chute is used as the cement raw material which is dispersed in the exhaust gas to increase the dust concentration in the extracted gas, it is not necessary to substantially change the existing facility. Further, since the temperature of the cement raw material is high, it is necessary to disperse a comparatively large amount of the cement raw material in order to control the temperature. Therefore, there is an advantage that it is possible to easily set the chlorine concentration in the fine powder dust to 20% or less by increasing the dust concentration in the extracted gas.

Further, when in parallel with the dispersion of the cement raw material charged into the kiln inlet part from the raw material chute, the cement raw material at a temperature of 600° C. to 700° C. in the preheater, and a cement raw material at a low temperature of 50° C. to 100° C. which is before being conveyed to the preheater, are supplied to adjust the temperature in the kiln inlet part, since the temperature of such cement raw materials is significantly lower than that of the cement raw material charged from the raw material chute, it is possible to efficiently reduce the temperature of the extracted gas by dispersing a small amount of such cement raw materials in the exhaust gas.

As a result, it is possible to prevent the draft blockage which may be caused in the extracted gas duct at the time when the dust concentration is increased. Also, there is an advantage that it is possible to prevent the generation of the coating as described above by reducing the temperature of the exhaust gas.

On the other hand, since, in this case, the dust concentration in the extracted gas is reduced relatively to the temperature of extracted gas, the chlorine concentration of the fine powder dust tends to be increased. Thus, it is possible to suppress the chlorine concentration to 20% or less in such a manner that in the first and second aspects according to the present invention, the predetermined particle size in the solid-gas separation means is adjusted to a relatively large particle size in the range of 12 μm to 30 μm, and that in the third to fifth aspects according to the present invention, the predetermined particle size in the solid-gas separation means is adjusted by the second control apparatus so that the chlorine concentration in the fine powder dust is set in the range of 5% to 20%.

However, the chlorine concentration in the fine powder dust is finally set to 20% or less by adjusting the temperature of the extracted gas by dispersing the cement raw material, that is, by making the dust concentration in the extracted gas higher than before. Thus, when the ratio of the amount of the extracted gas with respect to the amount of the exhaust gas discharged from the cement kiln, is extremely reduced as in the case of the conventional art, the chlorine concentration in the fine powder dust is made to fluctuate, so that it becomes difficult to stably hold the chlorine concentration in the fine powder dust at a desired value.

For this reason, as described in the second aspect of the present invention, it is preferred to extract one percent or more of the amount of the exhaust gas as the extracted gas.

DESCRIPTION OF SYMBOLS

Figure 1:
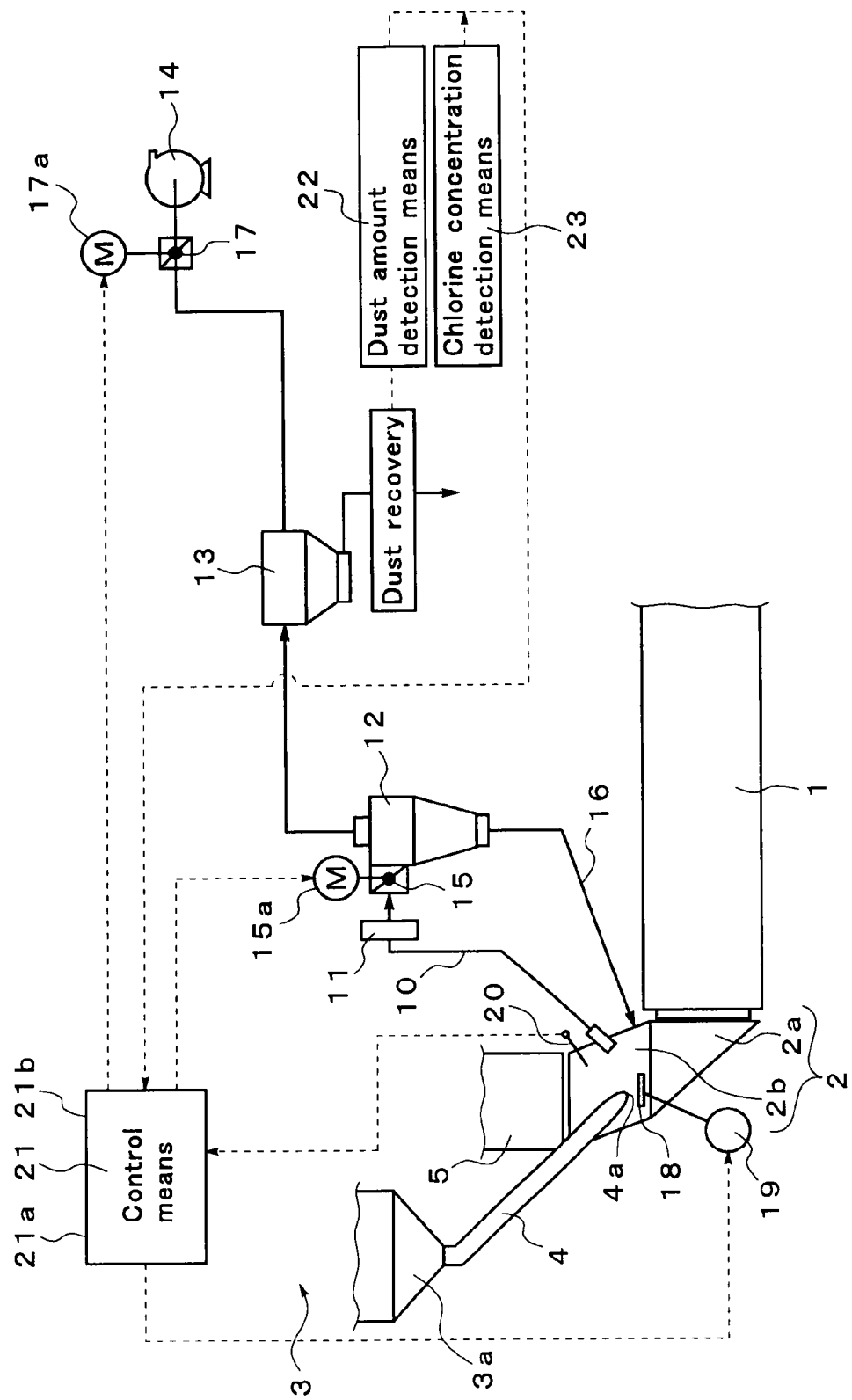
FIG. 1 is a figure showing a schematic configuration of an embodiment of an exhaust gas treatment system of a cement burning facility according to the present invention.
Figure 2:
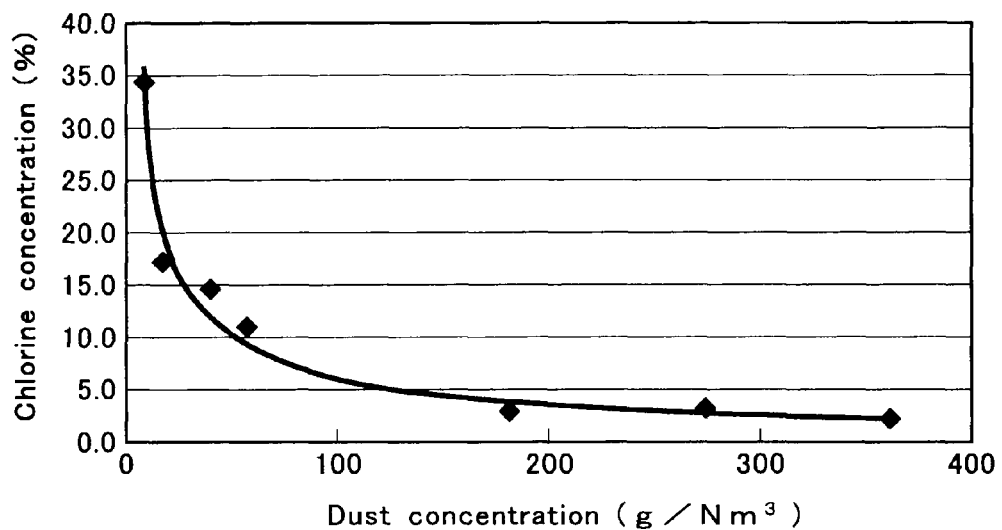
FIG. 2 is a graph showing a relationship between the dust concentration in the extracted gas and the chlorine concentration in the collected fine powder dust in the cement burning facility.
Figure 3:
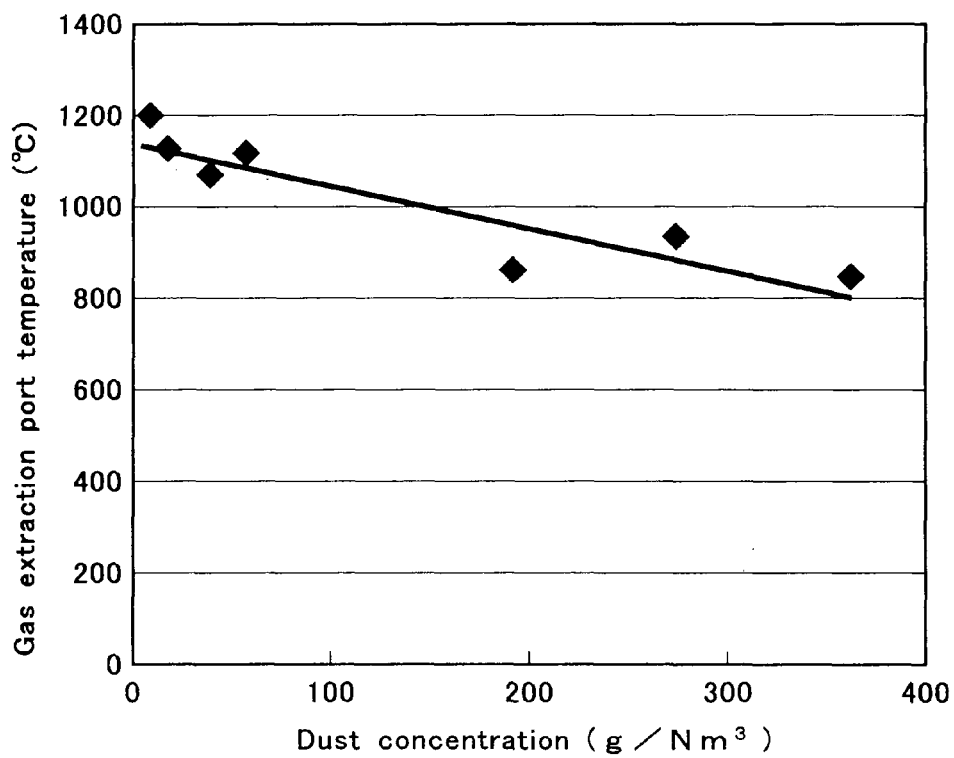
FIG. 3 is a graph showing a relationship between the temperature of the extracted gas and the dust concentration in the extracted gas in the cement burning facility.
Figure 4:
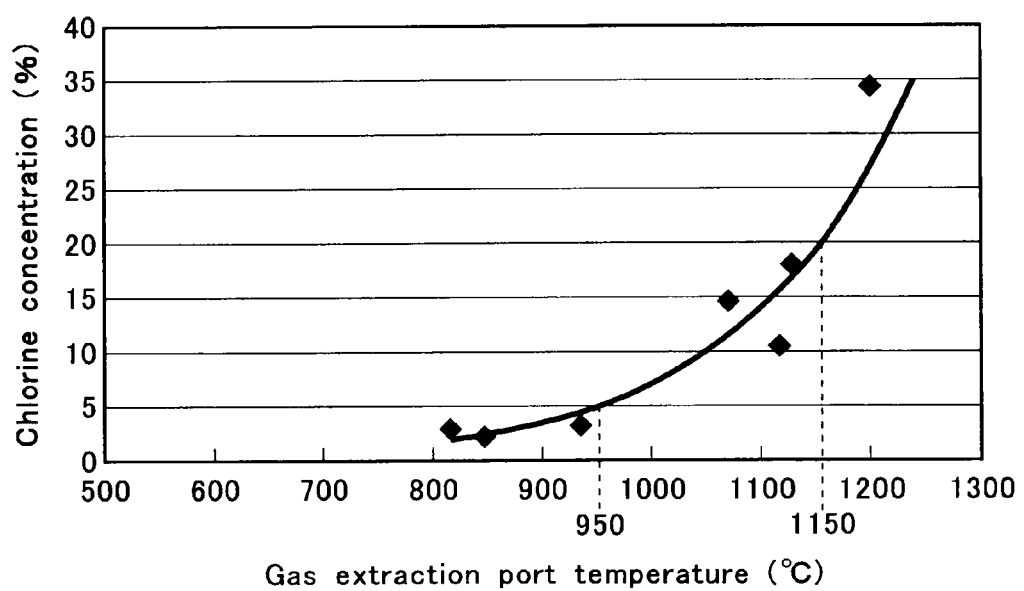
FIG. 4 is a graph showing a relationship between the temperature of the extracted gas and the chlorine concentration in the collected fine powder dust, obtained from the graphs shown in FIG. 2 and FIG. 3.

1 Cement kiln
2 Kiln inlet part

3 Preheater
3a Lowermost stage cyclone
4 Raw material chute
4a Drop port
10 Extracted gas duct
11 Cooler
12 Cyclone type classifier (Solid-gas separation means)
13 Bag filter (Dust trap means)
14 Induction fan
16 Return pipe
18 Dispersion plate (Dispersion means)
19 Drive motor (Drive means)
20 Temperature detector (Temperature detection means)
21a First control apparatus
21b Second control apparatus

BEST MODE FOR CARRYING OUT THE INVENTION

FIG. 1 shows an embodiment of an exhaust gas treatment system of a cement burning facility according to the present invention.

First, there will be described a cement manufacturing facility in which the above described exhaust gas treatment system is installed. Reference numeral 1 denotes a cement kiln to burn a cement raw material. The cement kiln 1 is a rotary kiln which is rotatably provided around a shaft center. In the left end part of the figure, there is provided a kiln inlet part 2 which includes a kiln inlet part housing 2a for supporting the rotary portion, and a rising part 2b of the kiln inlet part housing.

Further, a preheater 3 for preheating the cement raw material is provided on the upstream side of the kiln inlet part 2. A main burner for heating the inside of the kiln is provided in the outlet part of the kiln (not shown) in the right side of the figure.

Here, the preheater 3 is configured by a plurality of stages (for example, four stages) of cyclones arranged in series in the vertical direction, and is configured such that the cement raw material supplied to the cyclone of the uppermost stage (first stage) is successively sent to the lower cyclones. Further, a raw material chute 4 for sending the cement raw material inside the preheater 3 to the kiln inlet part 2 of the cement kiln 1 is connected to the bottom part of the cyclone 3a of the lowermost stage (fourth stage).

On the other hand, an exhaust gas pipe 5 for supplying the combustion exhaust gas discharged from the cement kiln 1 to the cyclone of the lowermost stage is connected to the rising part 2b of the kiln inlet part 2, so that the exhaust gas discharged from the upper part of the cyclone of the uppermost stage is exhausted by an exhaust fan via an exhaust line.

Further, an exhaust gas treatment system referred to as a chlorine bypass is installed in combination with the cement manufacturing facility having the above described configuration.

The exhaust gas treatment system is configured to extract, as extracted gas, a part of exhaust gas that contains dust and that is discharged from the cement kiln 1 so as to be sent to the preheater 3, and is configured to remove a chlorine compound contained in the extracted gas. In the figure, reference numeral 10 denotes an extracted gas duct which is configured to extract the extracted gas and is connected to the rising part 2b of the kiln inlet part 2 of the cement kiln 1.

Further, in the exhaust gas treatment system, there are successively provided, along the extracted gas duct 10, a cooler 11 configured to cool the extracted gas successively extracted from the extracted gas duct 10, a cyclone type classifier (solid-gas separation means) 12 configured to separate dust having a predetermined particle size or more from the extracted gas exhausted from the cooler 11, a bag filter (dust trap means) 13 configured to collect and remove entrained fine powder dust from the extracted gas from which the dust having the predetermined particle size or more is separated in the cyclone type classifier 12, and an induction fan 14 which is provided on the downstream side of the bag filter 13 and is configured to suck the extracted gas.

Here, the cooler 11 is configured to cool the extracted gas to the temperature of the melting point (600 to 700° C.) or less of the chlorine compound by performing heat exchange between the extracted gas and a refrigerant, such as for example, cooling air from a cooling fan or cooling water from a cooling pump.

Further, a valve 15 for flow rate adjustment which is enabled to freely adjust the opening degree thereof by a motor 15a is inserted at the extracted gas inlet port of the cyclone type classifier 12. On the other hand, a return pipe 16 configured to again return the separated dust having the predetermined particle size or more to the kiln inlet part 2 is connected to the bottom part of the cyclone type classifier 12.

Further, a valve 17 for flow rate adjustment which is enabled to freely adjust the opening degree thereof by a motor 17a is inserted on the suction side of the induction fan 14.

Also, a dispersion plate (dispersion means) 18 for dispersing the cement raw material in the exhaust gas is provided in the kiln inlet part 2.

The dispersion plate 18 is a plate-shaped member formed in a shape, such as square, elliptic and polygonal shapes, and is provided below a drop port 4a of the raw material chute 4, so as to freely project and retract from immediately below the drop port 4a in the state that the plate surface of the dispersion plate 18 is horizontally held. The dispersion plate 18 is to allow the cement raw material dropped from the drop port 4a to be dispersed in the exhaust gas in the kiln inlet part 2. In the proximal end portion of the dispersion plate 18, a drive motor (drive means) 19 is provided to adjust the dispersion amount of the cement raw material in such a manner that the dispersion plate 18 is made to project or retract to thereby change the area located immediately below the drop port 4a.

Further, in the exhaust gas treatment system, a temperature detector (temperature detection means) 20 for detecting the temperature of the extracted gas is provided at the rising part 2b of the kiln inlet part 2 and close to the connecting part of the extracted gas duct 10. Also, there is provided a first control apparatus 21a which operates the drive motor 19 on the basis of a detection signal from the temperature detector 20, to make the dispersion plate 18 project and retract so that the temperature of the extracted gas is held in the range of 950° C. to 1150° C.

Further, at the bottom part of the bag filter 13, there are provided detection means 22 for detecting the amount of the collected fine powder dust, and chlorine concentration detection means 23 for detecting the chlorine concentration in the fine powder dust. Also, there is provided a second control apparatus 21b configured to perform control to finally set the chlorine concentration in the fine powder dust in the range of 5 to 20% in such a manner that when the detection signal from the chlorine concentration detection means 23 becomes a value less than the chlorine concentration of 5% or a value more than the chlorine concentration of 20%, the flow rate of the extracted gas is changed by opening and closing the valve 15 and/or valve 17 for flow rate adjustment by operating the motor 15a and/or the motor 17a so that the classification particle size in the cyclone type classifier 12 is thereby adjusted in the range of 12 μm to 30 μm.

Note that the second control apparatus 21b can also be configured so as to adjust the flow rate of the extracted gas in the cyclone type classifier 12 by controlling the valves 15 and 17 and performing inverter control of the suction amount of the induction fan 14, or by performing inverter control of the suction amount of the induction fan 14 instead of the control of the valves 15 and 17. Thus, an overall control apparatus 21 is configured by the first and second control apparatuses 21a and 21b.

Further, there is connected to the rising part 2b an introduction pipe (not shown) for introducing, as a material for temperature adjustment in the kiln inlet part 2, the cement raw material in the temperature range of 600° C. to 700° C. which is supplied from the cyclone of the third stage, and the cement raw material in the low temperature range of 50° C. to 100° C. before it is conveyed to the preheater 3.

Next, there will be described an embodiment of an exhaust gas treatment method according to the present invention, in which the exhaust gas treatment system configured as described above is used.

First, in the cement burning facility, the cement raw material supplied to the first stage cyclone in the preheater 3 from a supply pipe (not shown) is preheated by hot exhaust gas which is supplied from the cement kiln 1 and ascends from the lower part of the preheater 3, as the cement raw material is successively dropped to the lower cyclones. The preheated cement raw material is finally introduced into the kiln inlet part 2 of the cement kiln 1 from the cyclone 3a of the lowermost stage via the raw material chute 4.

The cement raw material is burned to become clinker by being heated to about 1450° C. by the combustion exhaust gas from the main burner, during the process in which the cement raw material is gradually conveyed from the side of the kiln inlet part 2 to the side of the kiln outlet part in the right direction in the figure. Then, when reaching the kiln outlet part, the clinker is dropped into the clinker cooler. At this time, the clinker is cooled to a predetermined temperature by air supplied into the clinker cooler, and finally taken out from the clinker cooler.

In parallel with the conveyance process, wastes, such as sewage sludge and plastic, are charged into the inside of the cement kiln 1 from the side of the kiln inlet part 2 of the cement kiln 1 or from the side of the kiln outlet part, and are used as a part of the cement raw material or a part of the heating fuel.

Then, in the above described manufacturing process of the cement clinker, one percent or more of the amount of the exhaust gas discharged from the cement kiln 1 is continuously or intermittently extracted as the extracted gas from the kiln inlet part 2 of the cement kiln 1 through the extracted gas duct 10 by the induction fan 14.

In this case, the dispersion plate 18 is located below the drop port 4a of the raw material chute 4, so as to thereby disperse in the exhaust gas the cement raw material dropped from the raw material chute 4. Also, the amount of the cement raw material dispersed in the exhaust gas is adjusted by the first control apparatus 21a in such a manner that the dispersion plate 18 is made to project and retract below the drop port 4a of the raw material chute 4 by the operating drive motor 19 so as to allow the temperature of the extracted gas detected by the temperature detector 20 to be held in the range of 950° C. to 1150° C.

In this case, in combination with the dispersion of the cement raw material by the dispersion plate 18, it is also possible to adjust the temperature of the kiln inlet part 2 in such a manner that the cement raw material in the temperature range of 600° C. to 700° C. from the cyclone of the third stage, or the raw cement material in the low temperature range of 50° C. to 100° C. before it is conveyed to the preheater 3 is introduced into the kiln inlet part 2 from the introduction pipe connected to the rising part 2b.

Then, the extracted gas is cooled to the melting point or less (600° C. to 700° C.) of the chlorine compound in the cooler 11. Thereafter, the extracted gas is sent to the cyclone type classifier 12, so that coarse dust having the classification particle size in the range of 12 μm to 30 μm is separated. The separated coarse dust is again returned to the kiln inlet part 2 from the return pipe 16.

On the other hand, the extracted gas containing the fine powder dust whose particle size is smaller than the above described classification particle size and whose chlorine concentration is high, is sent to the bag filter 13. In the bag filter 13, the entrained fine powder dust is collected and recovered so as to be removed from the extracted gas. Thereby, it is possible to prevent the increase in the chlorine concentration in the system of the cement kiln 1 and the preheater 3. Then, the extracted gas, from which the fine powder dust is removed, is sent to an exhaust gas line from the exhaust side of the induction fan 14, so as to be exhausted.

Further, the amount of the fine powder dust collected by the bag filter 13 is detected by the detection means, and the chlorine concentration of the fine powder dust is detected by the chlorine concentration detection means 23.

When the chlorine concentration of the fine powder dust deviates from the range of 5 to 20%, the amount of the extracted gas sucked by the induction fan 14 is adjusted by the second control apparatus 21b, and/or the degree of opening of the valves 15 and 17 is adjusted by operating the motors 15a and 17a by the second control apparatus 21b. Thereby, the flow rate of the extracted gas flowing through the extracted gas duct 10 is increased or decreased to adjust the classification particle size in the cyclone type classifier 12, so that the chlorine concentration is controlled to be set again in the range of 5 to 20%.

Therefore, when the temperature of the extracted gas is held in the above described range of 950° C. to 1150° C. by the first control apparatus 21a, and thereby when the chlorine concentration in the fine powder dust can be stably held in the range of 5 to 20% on the basis of the predetermined classification particle size in the cyclone type classifier 12, the second control apparatus 21b is not operated.

As described above, according to the exhaust gas treatment method configured as described above, the fine powder dust having the high chlorine concentration and contained in the extracted gas extracted from the kiln inlet part 2 is collected and removed by the bag filter 13, so as to thereby make it possible to prevent the increase in the chlorine concentration in the system including the cement kiln 1 and the preheater 3.

Further, the temperature of the extracted gas is held in the range of 950° C. to 1150° C. in such a manner that the dispersion plate 18 is moved by the first control apparatus on the basis of the temperature of the extracted gas, to adjust the amount of the cement raw material dispersed in the exhaust gas at the kiln inlet part 2 from which the extracted gas is extracted. Thereby, it is possible to easily set the chlorine concentration in the finally collected fine powder dust to 20% or less.

As a result, the handling property of the fine powder dust collected in the bag filter 13 is made excellent. Also, there is no possibility that adverse effects, such as the blockade and clogging, are caused in the facility due to the chlorine component contained in the fine powder dust during the conveyance of the fine powder dust. Therefore, it is possible to stably operate the facility.

Further, it is only necessary that the classification particle size of the coarse dust returned to the kiln inlet part 2 from the extracted gas is adjusted to the range of 12 μm to 30 μm. Thereby, a general-purpose cyclone type classifier, and the like, can be used, and hence there is also no possibility that the facility cost is increased.

Note that only the case where the extracted gas is extracted from the kiln inlet part 2 of the cement kiln 1 is described in the above described embodiment, but the present invention is not limited to this. It may also be configured such that the extracted gas is extracted from the exhaust gas pipe 5 at the preheater 3.

Further, as the solid-gas separation means and the dust trap means, it is possible to use various types other than the cyclone type classifier 12 and the bag filter 13 as described above.

Further, as the drive means of the dispersion plate 18 and the valves 15 and 17, it is also possible to use drive sources, such as a hydraulic cylinder or a pneumatic cylinder other than the drive motor 19 and the motors 15*a* and 17*a*.

Further, it may also be configured such that on the basis of the detection value obtained by the chlorine concentration detection means 23, the valves 15 and 17 are manually opened and closed, or the amount of the extracted gas sucked by induction fan 14 is manually switched, without the use of the above described second control apparatus 21*b*.

INDUSTRIAL APPLICABILITY

According to the present invention, it is possible to provide an exhaust gas treatment method and system of a cement burning facility which can be configured by general-purpose apparatuses, so as to thereby reduce the system cost, and which is capable of improving the handling property of the collected fine powder dust, so as to thereby realize the stable operation of the system without the need of maintenance.

The invention claimed is:

1. An exhaust gas treatment method of a cement burning facility, configured to extract, as extracted gas, a part of exhaust gas that contains dust and that is discharged from a cement kiln for burning a cement raw material and sent to a preheater for preheating the cement raw material, from a lowermost part of the preheater or a kiln inlet part of the cement kiln, configured, after the extracted gas is cooled to a melting point or less of a chlorine compound, to separate the dust having a predetermined particle size or more from the extracted gas by solid-gas separation means, and to return the separated dust to the burning process of the cement raw material, and configured to collect and remove, by dust trap means, fine powder dust having the predetermined particle size or less from the extracted gas containing the fine powder dust, and to thereby remove the chlorine compound contained in the extracted gas, wherein the chlorine concentration in the collected fine powder dust is set in a range of 5 to 20% in such a manner that the cement raw material is dispersed in the exhaust gas at a lowermost part of the preheater or a kiln inlet part of the cement kiln, that the temperature of the extracted gas is held in a range of 950° C. to 1150° C. by adjusting the dispersion amount of the cement raw material, and that the predetermined particle size in the solid-gas separation means is adjusted in a range of 12 μm to 30 μm.

2. The exhaust gas treatment method of the cement burning facility according to claim 1, wherein one percent or more of the amount of the exhaust gas is extracted as the extracted gas.

3. An exhaust gas treatment system of a cement burning facility, configured to extract, as extracted gas, a part of exhaust gas that contains dust and that is discharged from a cement kiln for burning a cement raw material and is sent to a preheater for preheating the cement raw material, and configured to remove a chlorine compound contained in the extracted gas, wherein along an extracted gas duct which is connected to a lowermost part of the preheater or a kiln inlet part of the cement kiln to extract the extracted gas, there are provided: a cooler configured to cool the extracted gas successively extracted from the extracted gas duct to a melting point or less of a chlorine compound; solid-gas separation means configured to separate the dust having a predetermined particle size or more from the extracted gas exhausted from the cooler; dust trap means configured to collect and remove entrained fine powder dust having the predetermined particle size or less from the extracted gas from which the dust having the predetermined particle size or more is separated in the solid-gas separation means; and an induction fan provided in the downstream side of the dust trap means and configured to suck the extracted gas, and wherein dispersion means configured to disperse the cement raw material in the exhaust gas is provided at a lowermost part of the preheater or at a location inside the kiln inlet part of the cement kiln and close to a connection part of the extracted gas duct, comprising: drive means configured to adjust the amount of the cement raw material dispersed by the dispersion means; temperature detection means configured to detect the temperature of the extracted gas; a first control apparatus configured to hold the temperature of the extracted gas in a range of 950° C. to 1150° C. on the basis of the temperature detected by the temperature detection means; and a second control apparatus configured to adjust the predetermined particle size in the solid-gas separation means to a range of 12 μm to 30 μm so that the chlorine concentration in the fine powder dust collected by the dust trap means is set in a range of 5% to 20%.

4. The exhaust gas treatment system of the cement burning facility according to claim 3, wherein the solid-gas separation means is a cyclone type classifier, wherein a flow rate control apparatus of the extracted gas is provided on the inlet side of the cyclone type classifier, and wherein a chlorine concentration detector of the fine powder dust is provided and the second control apparatus controls, on the basis of a signal detected by the chlorine concentration detection means, the amount of the extracted gas sucked by the induction fan and/or the flow rate control apparatus of the extracted gas.

5. The exhaust gas treatment system of the cement burning facility according to one of claim 3 and claim 4, wherein the dispersion means is a dispersion plate which is provided below a drop port of a raw material chute for charging the cement raw material into the kiln inlet part from the preheater, so as to freely project and retract from immediately below the drop port, and which is configured to disperse in the exhaust gas the cement raw material dropped from the drop port.

\* \* \* \* \*